United States Patent [19]

Tzikas

[11] Patent Number: 4,935,501
[45] Date of Patent: Jun. 19, 1990

[54] REACTIVE DYES CONTAINING FLUORO-CHLORO-PYRIMIDYL GROUPS AND VINYLSULFONYL GROUPS OR THE LIKE

[75] Inventor: Athanassios Tzikas, Pratteln, Switzerland

[73] Assignee: Ciba-Geigy Corporation, Ardsley, N.Y.

[21] Appl. No.: 168,629

[22] Filed: Mar. 7, 1988

Related U.S. Application Data

[63] Continuation of Ser. No. 873,437, Jun. 4, 1986, abandoned, which is a continuation of Ser. No. 636,362, Jul. 30, 1984, abandoned.

[30] Foreign Application Priority Data

Jul. 29, 1983 [CH] Switzerland ............... 4170/83

[51] Int. Cl.$^5$ .............. C09B 62/08; C09B 62/20; C09B 62/24; C09B 62/507
[52] U.S. Cl. ................ 534/634; 534/617; 534/618; 534/622; 534/623; 534/624; 534/625; 534/626; 534/627; 534/628; 534/629; 534/630; 534/631; 534/632; 534/633; 534/635; 534/636; 534/637; 534/638; 534/642; 534/641; 544/187; 544/188; 544/189; 544/65; 540/122; 540/133; 540/139
[58] Field of Search ............... 534/617-644; 544/187, 188, 189, 65; 540/122, 132, 139

[56] References Cited

U.S. PATENT DOCUMENTS

| | | | |
|---|---|---|---|
| 3,920,632 | 11/1975 | Hohmann et al. | 544/187 |
| 4,024,123 | 5/1977 | Dussy et al. | 534/618 |
| 4,126,609 | 11/1978 | Jager | 584/643 X |
| 4,248,771 | 2/1981 | Scholl et al. | 534/638 X |
| 4,360,460 | 11/1982 | Hurter | 534/643 X |
| 4,425,270 | 1/1984 | Yamada et al. | 534/637 |
| 4,560,388 | 12/1985 | Rohrer | 534/638 X |
| 4,746,732 | 5/1988 | Tzikas | 534/637 |

FOREIGN PATENT DOCUMENTS

| | | | |
|---|---|---|---|
| 0084314 | 7/1983 | European Pat. Off. | 534/637 |
| 3019936 | 12/1981 | Fed. Rep. of Germany | 531/635 |

*Primary Examiner*—Floyd D. Higel
*Attorney, Agent, or Firm*—Wenderoth, Lind & Ponack

[57] ABSTRACT

Reactive dyes of the formula

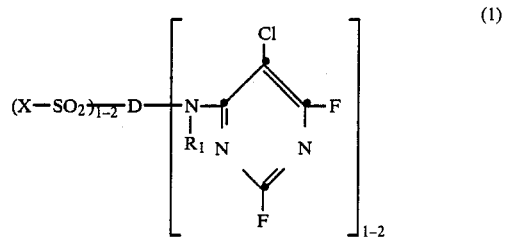

in which D is the radical of a dye of the monoazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $R_1$ is hydrogen or an unsubstituted or substituted $C_{1-4}$-alkyl radical, and X is the vinyl, $\beta$-sulfatoethyl, $\beta$-thiosulfatoethyl, $\beta$-chloroethyl or $\beta$-acetoxyethyl group, are suitable in particular for dyeing and printing cellulose-containing fibre materials by the cold pad-batch method and produce, in high dyeing yields, dyeings and prints having good fastness properties.

14 Claims, No Drawings

REACTIVE DYES CONTAINING FLUORO-CHLORO-PYRIMIDYL GROUPS AND VINYLSULFONYL GROUPS OR THE LIKE

This application is a continuation of now abandoned application Ser. No. 873,437, filed Jun. 4, 1986, which application is in turn a continuation of now abandoned application Ser. No. 636,362, filed Jul. 30, 1984.

The present invention relates to novel reactive dyes, to a process for their preparation, and to their use for dyeings and printing fibre materials.

The practice of dyeing with reactive dyes has in recent years led to increased demands on the quality of the dyeing and the economics of the dyeing process. There consequently continues to be a demand for new reactive dyes with improved properties, in particular application properties.

The demand these days in the dyeing of cotton by the cold pad-batch method is for reactive dyes which are sufficiently substantive at the low dyeing temperature and which also have good wash-off properties when unfixed. They should also be highly reactive, so that only short batching times are required, and they should in particular produce dyeings having high degrees of fixation. Existing dyes meet these requirements only to an insufficient degree.

It is therefore the object of the present invention to provide new, improved reactive dyes for the cold pad-batch method which have the qualities characterised above to a high degree. The new dyes should be distinguished especially by high degrees of fixation and high fibre-dye bond stabilities, and the unfixed portions on the fibre should moreover be readily washed off. They should also produce dyeings having good all-round fastness properties, for example light- and wet-fastness properties.

This object is achieved with the novel bireactive dyes defined hereinafter.

The invention provides reactive dyes of the formula

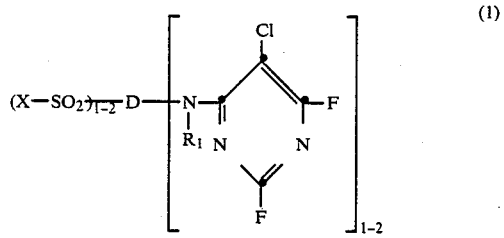

(1)

in which D is the radical of a dye of the monoazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, $R_1$ is hydrogen or an unsubstituted or substituted $C_{1-4}$-alkyl radical, and X is a vinyl, β-sulfatoethyl, β-thiosulfatoethyl, β-chloroethyl or β-acetoxyethyl group.

The radical D in the formula (1) can be substituted in the customary manner. Examples of further substituents on the radical D are alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-propylsulfamoyl, N-isopropylsulfamoyl or N-butylsulfamoyl, N-(β-hydroxy-ethyl)-sulfamoyl, N,N-di-(β-hydroxyethyl)-sulfamoyl, N-phenylsulfamoyl, ureido, hydroxyl, carboxyl, sulfomethyl and sulfo. The radical D preferably contains one or more sulfonic acid groups. Reactive dyes of the formula (1) in which D is the radical of an azo dye contain as substituents especially methyl, ethyl, methoxy, ethoxy, acetylamino, benzoylamino, amino, chlorine, bromine, ureido, hydroxyl, carboxyl, sulfomethyl or sulfo.

An alkyl radical $R_1$ is straight-chain or branched; it can be further substituted, for example by halogen, hydroxyl, cyano, $C_{1-4}$-alkoxy, carboxyl or sulfo. Examples of $R_1$ are the radicals methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. $R_1$ is preferably hydrogen, methyl or ethyl.

Preferred reactive dyes have the formula (1) in which D is the radical of a monoazo dye or of a corresponding metal complex azo dye. In this case the reactive radicals, i.e. the vinyl or β-sulfatoethyl etc. -sulfonyl radical and the 2,4-difluoro-5-chloropyrimidyl radical are bonded to different or identical radicals of starting components, namely diazo and coupling components. The reactive dyes then for example have the formula

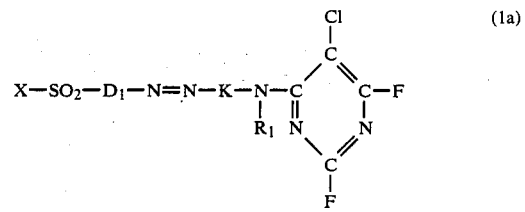

(1a)

or

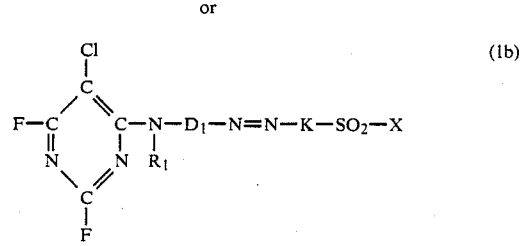

(1b)

in which $R_1$ and X are as defined under the formula (1), $D_1$ is the radical of a diazo component, and K is the radical of a coupling component. If two X-SO₂ reactive radicals are present, they are bonded in particular to the radical of the diazo component; and in the case where the dye molecule contains two 2,4-difluoro-5-chloropyrimidyl radicals, these are preferably in the coupling component. Accordingly, depending on the indices attached to the reactive radicals in the formula (1), trireactive and tetrareactive dyes are also included. The above explanations also hold analogously for metal complex azo dyes.

Also included are reactive dyes of the formula (1) in which one of the reactive radicals or both are bonded to the chromophore via a radical of the formula

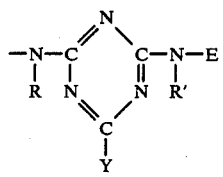

the X-SO₂- radical or the 2,4-difluoro-5-chloropyrimidylamino radical being bonded to E; E is an unsubstituted or substituted aliphatic or aromatic bridge member. The bridge member E is preferably an alkylene or arylene radical. For instance, E can be a long (for example of 10 or more carbon atoms) or shorter, straight-chain or branched alkylene radical; it can be in particular an alkylene radical having 2 to 6 carbon atoms, for example ethylene, propylene, butylene, hexylene or cyclohexylene. An arylene radical E is for example a naphthylene radical, the radical of a diphenyl or of stilbene or in particular a phenylene radical. The radical E can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo. R and R′, independently of each other, are each hydrogen or an unsubstituted or substituted C₁₋₄-alkyl radical; and Y is a halogen atom, a substituted or unsubstituted amino group, hydroxyl, or an alkoxy, aryloxy, alkylthio or arylthio group.

Preference is given to:
Reactive dyes of the formula

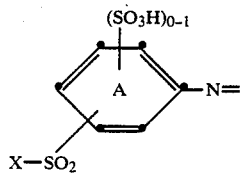

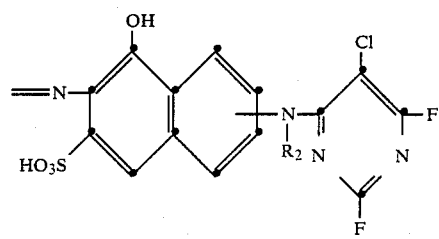

in which R₂ is hydrogen, methyl or ethyl, X is as defined under the formula (1), and the benzene ring A can be further substituted;
reactive dyes of the formula

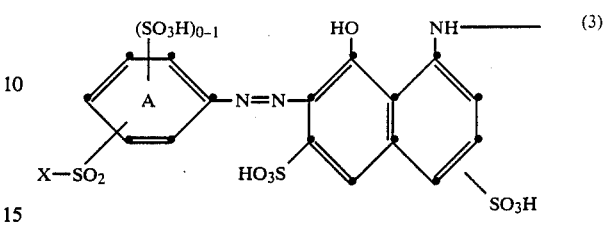

in which X is as defined under the formula (1), and the benzene ring A can be further substituted; reactive dyes of the formula

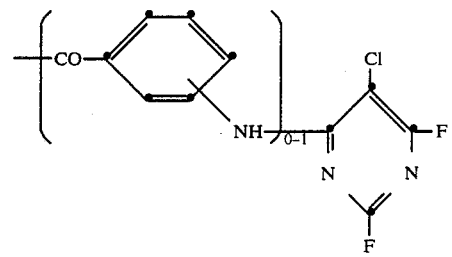

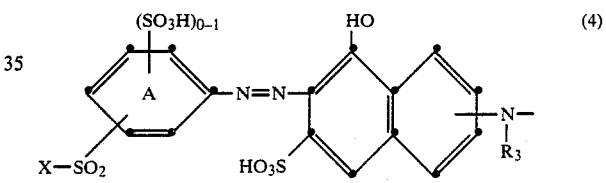

in which R₃ is hydrogen, methyl or ethyl, X is as defined under the formula (1), and the benzene ring A can be further substituted; and reactive dyes of the formula

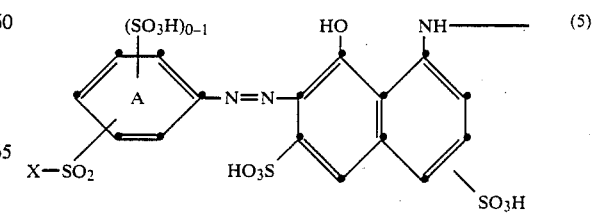

-continued

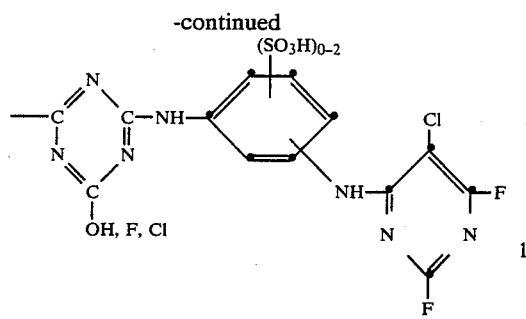 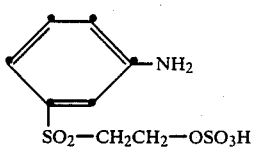

in which X is as defined under the formula (1), and the benzene ring A can be further substituted.

Preference is also given to reactive dyes of the formulae (2) to (5) in which the benzene rings A are not further substituted and/or in which X is the vinyl or β-sulfatoethyl group.

The process for preparing the reactive dyes of the formula (1) comprises reacting dyes of the formula

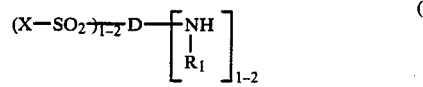

in which D, $R_1$ and X are as defined under the formula (1), or their precursors, with 2,4,6-trifluoro-5-chloropyrimidine to reactive dyes of the formula (1), or converting the resulting intermediates into the desired end dyes, and if desired subsequently carrying out a further conversion reaction.

The starting materials are thus dyes which already contain an $X-SO_2-$ group, and the $-N(R_1)H$ group is acylated with 2,4,6-trifluoro-5-chloropyrimidine; or use is made of corresponding precursors, for example a diazo component of the formula

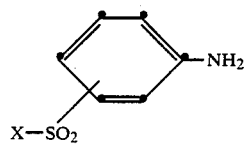

and these precursors are coupled onto a coupling component which contains an $-N(R_1)H$ group and the $-N(R_1)H$ group is acylated before or after the coupling with 2,4,6-trifluoro-5-chloropyrimidine. In the embodiment described above, the acylatable $-N(R_1)H$ group can also be present in the diazo component, and the $X-SO_2-$ group correspondingly in the coupling component. The diazo components used in this case are especially 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired use is made of corresponding acetylamino and nitro compounds in which the acetylamino and nitro groups respectively are converted into the $H_2N$ group by hydrolysis and reduction respectively before the condensation with 2,4,6-trifluoro-5-chloropyrimidine. The position of the reactive radicals in the finished azo dye is thus not inflexibly tied to certain starting components - diazo or coupling components.

The two reactive radicals can also be bonded to one and the same component, for example by using a non-fibre-reactive diazo component and a coupling component of the formula $$\text{(8)}$$

and acylating the $-NH_2$ group after the coupling with 2,4,6-trifluoro-5-chloropyrimidine.

The process variant where the starting materials are dye precursors is suitable for preparing reactive dyes of the formula (1) in which D is the radical of a dye composed of two or more components. Examples of such dyes composed of two or more components are monoazo, metal complex azo, formazan and azomethine dyes. The reactions involved in preparing the end dyes from precursors are usually couplings leading to azo dyes.

In principle, the reactive dyes of the formula (1) of all dye classes can be prepared in a manner known per se or analogously to known procedures by starting from precursors or intermediates for dyes containing fibre-reactive radicals according to the formula (1) or introducing these fibre-reactive radicals into intermediates of dye character which are suitable for this purpose.

Another advantageous method comprises first of all preparing a dye which contains a precursor of the reactive radical and subsequently converting this precursor into the end stage, for example by esterification or an addition reaction. For example, it is possible to prepare a dye of the formula (6) in which X is a $HO-CH_2CH_2-$ radical and to react the intermediate with sulfuric acid before or after the acylation, so that the hydroxyl group is converted into the sulfato group; or to use an analogous dye in which X is the vinyl group, $H_2C=CH-$, and to add thiosulfuric acid onto the intermediate, forming a $HO_3SS-CH_2CH_2-$radical. The sulfation of the hydroxyl group in a dye of the formula (4) or a suitable precursor is effected for example by reaction at 0° C. to moderately elevated temperatures with concentrated sulfuric acid. The sulfation can also be effected by reacting the hydroxy compound with 2 equivalents of chlorosulfonic acid per hydroxyl group at 10 to 80° C. in a polar organic solvent, for example N-methylpyrrolidone. The sulfation is preferably effected by adding the compound in question at temperatures between 5° and 15° C. to sulfuric acid monohydrate. The introduction into a compound of the formula (1) or an intermediate, of a radical detachable under alkaline conditions, for X other than the sulfato group, for example a thiosulfato group, is effected in a manner known per se.

Moreover, elimination reactions can be carried out subsequently to the synthesis. For example, the reactive dyes of the formula (1) which contain sulfatoethylsulfonyl radicals can be treated with acid-eliminating agents, such as sodium hydroxide, and the sulfatoethylsulfonyl radicals turn into vinylsulfonyl radicals.

In many cases the method of preparation described above, namely via an intermediate of the reactive radical, has just a single product and goes to completion.

If groups capable of metal complex formation are present in the reactive dyes prepared, the reactive dyes can also be subsequently metallised.

As the individual steps of the process given above can be carried out in different orders, there are various possible process variants. In general the reaction is carried out in successive steps, the order of the elementary reactions between the individual reactants advantageously being arranged in accordance with the particular conditions. As hydrolysis of the 2,4-difluoro-5-chloropyrimidyl radical can occur under certain conditions, an intermediate which contains acetylamino groups has to be hydrolysed (to split off the acetyl groups) before the condensation with 2,4,6-trifluoro-5-chloropyrimidine. Which part of the overall reaction is advantageously carried out first varies from case to case and is arranged especially according to the solubility of the amino compounds involved and the basicity of the amino groups to be acylated. The acylation of the dyes of the formula (6) or the dye precursors with 2,4,6-trifluoro-5-chloropyrimidine is effected by methods known per se, preferably in aqueous solutions or suspensions and in the presence of alkaline acid-binding agents, for example aqueous alkali metal hydroxides, carbonates or bicarbonates.

The most important process variants are reflected in the illustrative embodiments.

There now follow specific examples of possible starting materials which can be used for preparing the reactive dyes of the formula (1).

The dyes of the formula (6) can be in particular dyes of the following structural types:

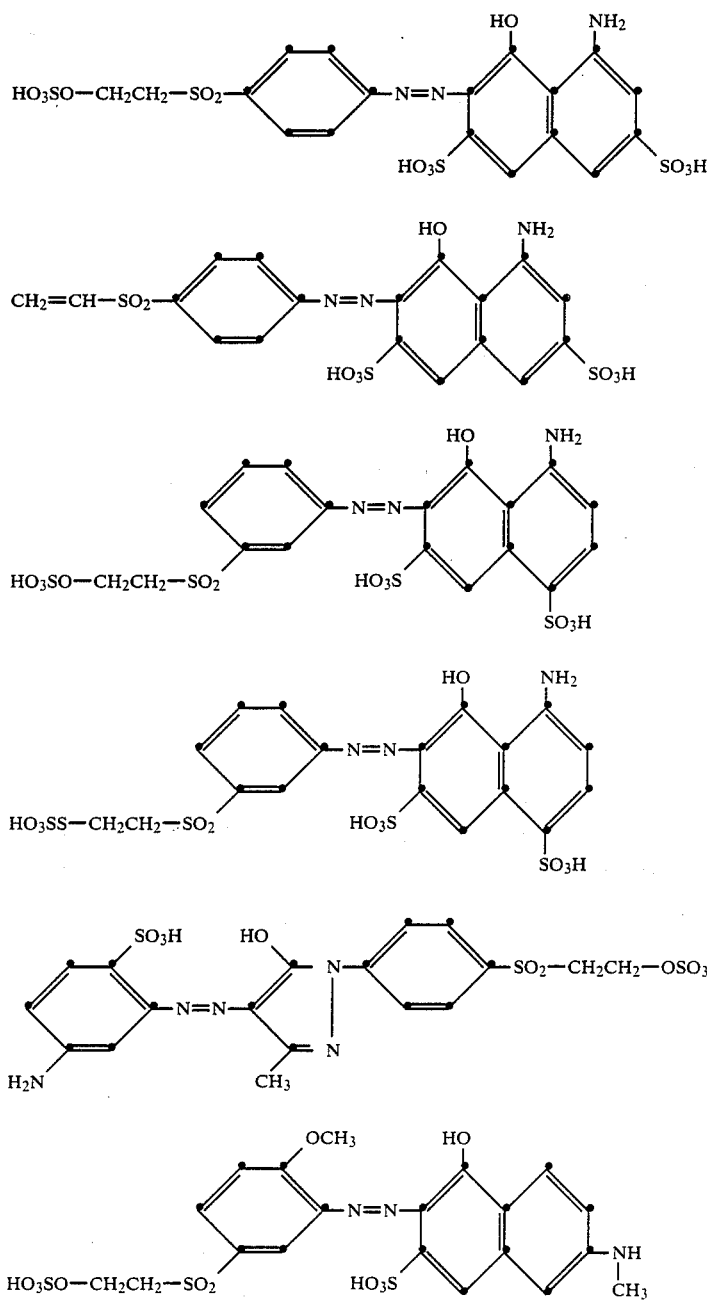

-continued
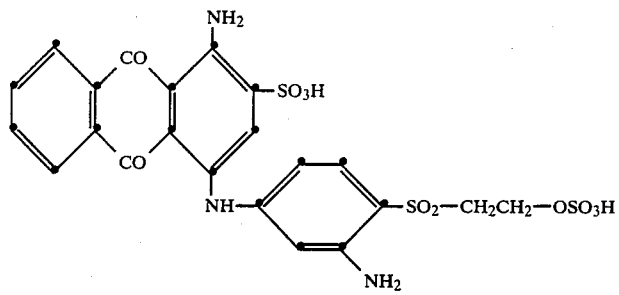
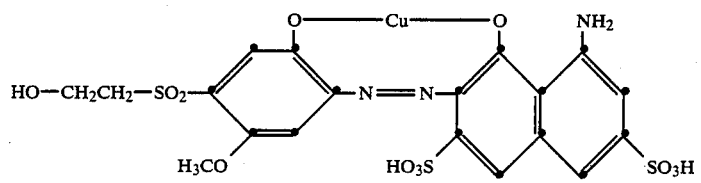
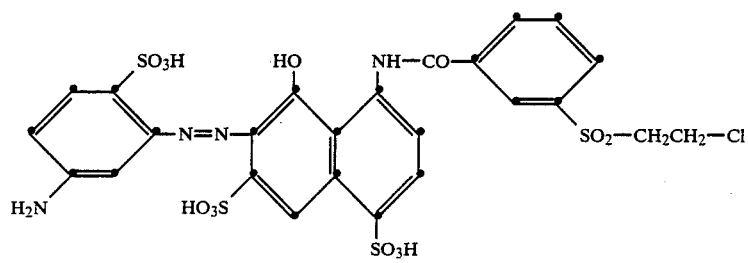
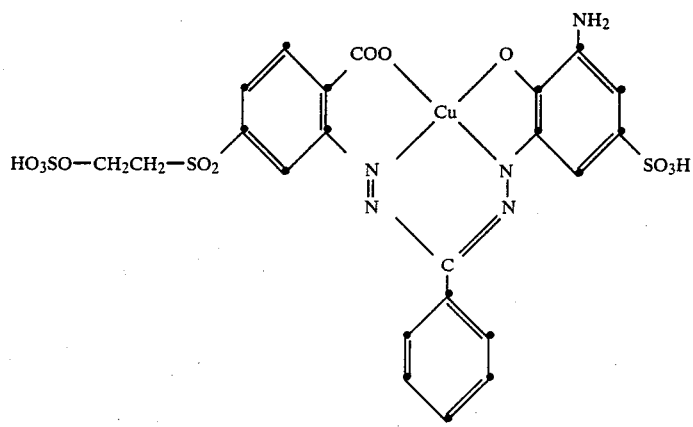
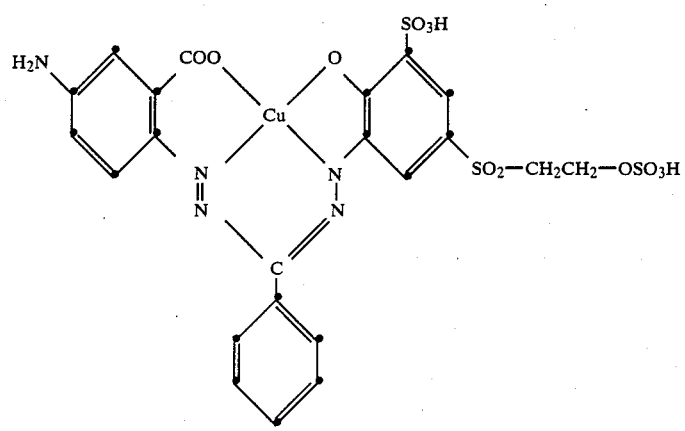

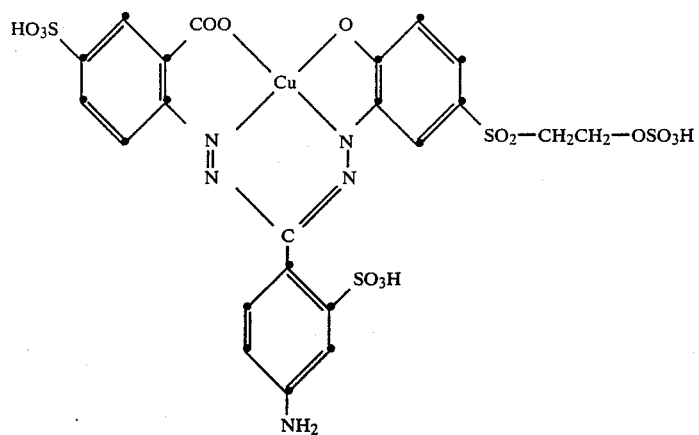
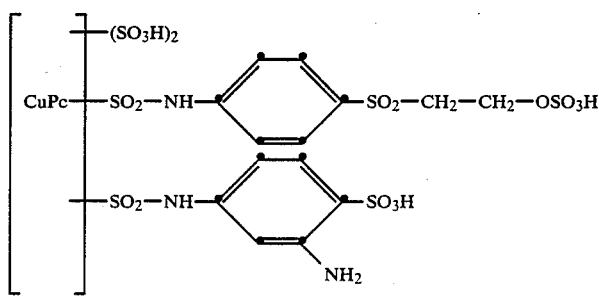
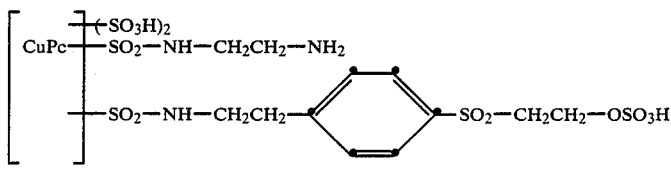
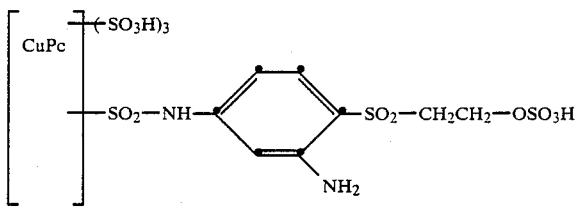
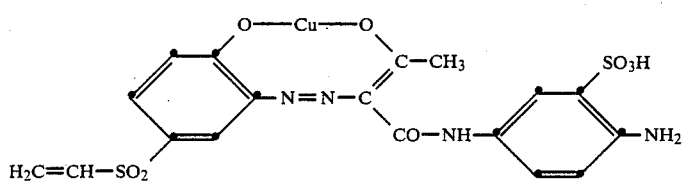
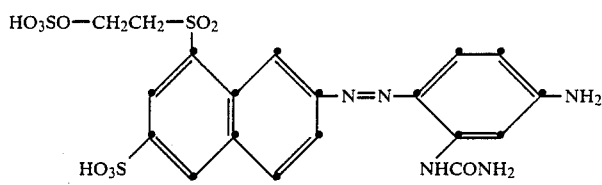

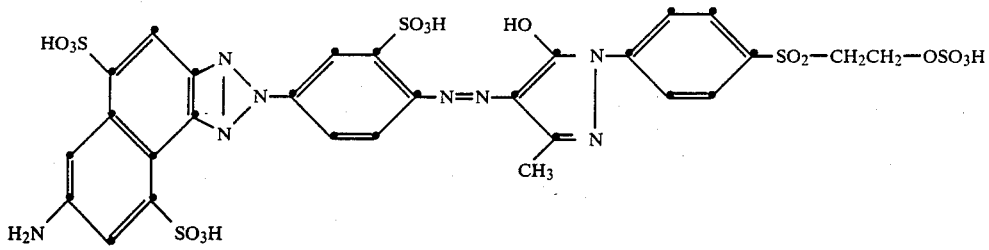

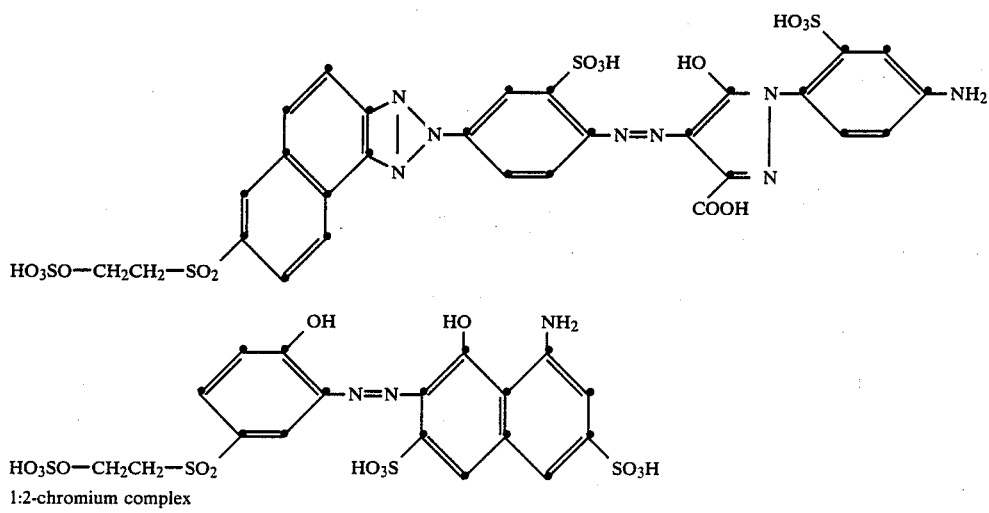

1:2-chromium complex

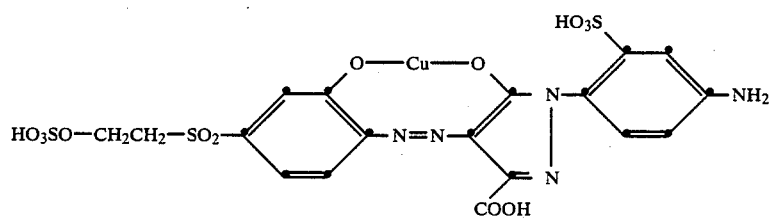

If, in preparing the preferred reactive dyes of the formula (1) in which D is the radical of an azo dye, the starting materials are not finished amino dyes, for example are not those described above, but are dye precursors, i.e. diazo and coupling components, one of the two components has to have at least one acylatable amino group and the other at least one $X-SO_2-$ group. Possible diazo components are in the main suitable compounds of the aminobenzene and aminonaphthalene series, for example those contained in the azo dyes of the formulae given above, such as 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoyl-amino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethan-2,2'-disulfonic acid, 4,4'-diaminostilbene-2,2'-disulfonic acid, 4,4'-diaminodiphenylethane-2,2'-disulfonic acid, 2-amino5-aminomethylnaphthalene-1-sulfonic acid, 2-amino-5-aminomethylnaphthalene-1,7-disulfonic acid, 1-amino-4-methoxy5-aminomethylbenzene-6-sulfonic acid and 1,3,5-triaminobenzene.

Examples of aromatic amines which can serve as diazo components in preparing the monoazo or disazo dyes and which contain one or two bonded groups of the formula $X-SO_2-$ are:

1-Amino-4-β-sulfatoethylsulfonylbenzene, 1-amino4-β-thiosulfatoethylsulfonylbenzene, 1-amino-4-vinylsulfonylbenzene, 1-amino-4-β-chloroethylsulfonylbenzene, 1-amino-3-β-sulfatoethylsulfonylbenzene, 1-amino-3-vinylsulfonylbenzene, 1-amino-2-methoxy-5-β-sulfatoethylsulfonylbenzene, 1-amino-2-methoxy-5β-thiosulfatoethylsulfonylbenzene, 1-amino-2-methoxy-5-vinylsulfonylbenzene, 1-amino-4-methoxy-3-β-sulfatoethylsulfonylbenzene, 1-amino-4-methoxy3-β-vinylsulfonylbenzene, 1-amino-2,5-dimethoxy-4-β-sulfatoethylsulfonylbenzene, 1-amino-2,5-dimethoxy-4-vinylsulfonylbenzene, 1-amino-2-methoxy-4-β-sulfatoethylsulfonyl-5-methylbenzene, 1-amino-2-methoxy-4-vinylsulfonyl-5-methylbenzene, 1-amino-3-β-sulfatoethylsulfonyl-6-carboxybenzene, 1-amino-3-vinylsulfonyl-6-carboxybenzene, 1-amino-4-sulfatoethylsulfonylbenzene-2-sulfonic acid, 1-amino-4-vinyl-sulfonylbenzene-2-sulfonic acid, 1-amino-5-vinylsulfonylbenzene-2,4-disulfonic acid, 1-amino-2-hydroxy-5-β-sulfatoethylsulfonylbenzene, 1-amino-2-hydroxy-4-β-sulfatoethylsulfonylbenzene, 1-amino-2-hydroxy-5-β-sulfatoethylsulfonylbenzene-3-sulfonic acid, 1-amino-2-bromo-4-β-sulfatoethylsulfonylbenzene, 1-amino-2,6-dichloro-4-β-sulfatoethylsulfonylbenzene, 1-amino-2,4-di-(β-sulfatoethylsulfonyl)-benzene, 1-amino-2,4-di-(β-sulfatoethylsulfonyl)-5-chlorobenzene, benzene, 1-amino-2,4-di-(vinylsulfonyl)-benzene, 1-amino2,4-di-(vinylsulfonyl)-5-chlorobenzene, 1-amino-2,4-di-(β-acetoxyethylsulfonyl)-benzene, 1-amino-2,4-di-(β-acetoxyethylsulfonyl)-5-chlorobenzene, 2-amino-8-β-sulfatoethylsulfonylnaphthalene, 2-amino-6-β-sulfatoethylsulfonylnaphthalene, 2-amino-6-β-sulfatoethylsulfonylnaphthalene-1-sulfonic acid, 2-amino-8-β-sulfatoethylsulfonylnaphthalene-6sulfonic acid and 2-amino-6,8-di-(β-sulfatoethylsulfonyl)naphthalene.

A mention should also go to the corresponding β-hydroxy compounds which can be used as precursors, examples being 1-amino-4-β-hydroxyethylsulfonylbenzene, 1-amino-3-β-hydroxyethylsulfonylbenzene, 1-amino-2,4-di-(β-hydroxy-ethylsulfonyl)-benzene and 1-amino-2,4-di-(β-hydroxyethyl-sulfonyl)-5-chlorobenzene.

If the diazo component to be used is not a diamine but is an aminoacetylamino compound from which the acetyl group is subsequently to be reeliminated by hydrolysis, as mentioned above in the description of the process, the monoacetyl compounds of the abovementioned diazo components are possible, examples being 1-acetylamino-3-aminobenzene-4-sulfonic acid and 1-acetylamino-4-aminobenzene-3-sulfonic acid.

The coupling components are chiefly suitable compounds of the aminobenzene and naphthalene series, for example anilines, N-monosubstituted anilines, m-phenylenediamine derivatives, aminonaphthalenes, naphthols, aminonaphthalenesulfonic acid, naphtholsulfonic acids or aminonaphtholsulfonic acids and also pyrazolones, aminopyrazoles, aminopyridines, hydroxypyridines/pyridones, aminopyrimidines, hydroxypyrimidines, indoles, barbituric acid derivatives or acetoacetarylides. Examples are 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diamino-benzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxy-naphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 2-amino-5-hydroxynaphthalene-7-sulfonic acid, 2-methyl- or 2-ethylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or 2-ethyl-amino-8-hydroxynaphthalene-6-sulfonic acid, 2-amino-8-hydroxynaphthalene-3,6-disulfonic acid, 1-amino-5-hydroxy-naphthalene-7-sulfonic acid, 1-amino-8-hydroxynaphthalene-3,6- or -4,6-disulfonic acid, 1-(4'-aminobenzoylamino)-8-hydroxynaphthalene-3,6- or -4,6-disulfonic acid, 2-(4'-amino-3'-sulfophenylamino)-5-hydroxynaphthalene-7-sulfonic acid, 1-amino-8-hydroxynaphthalene-4-sulfonic acid, 2,4,6-triamino-3-cyanopyridine, 1-β-aminoethyl-3-cyano-4-methyl-6-hydroxypyrid-2-one 1-γ-aminopropyl-3-sulfomethyl-4-methyl-6-hydroxypyrid-2-one, 1,3-diaminobenzene, 1-amino-3-(N,N-di-β-hydroxyethylamino)-benzene, 1-amino-3-(N,N-di-β-sulfatoethylamino)-benzene, 1-amino-3-(N,N-di-β-hydroxyethyl-amino)-4-methoxybenzene, 1-amino-3-(N,N-di-β-sulfatoethyl-amino)-4-methoxybenzene, 1-amino-3-sulfobenzylaminobenzene, 1-amino-3-sulfo-benzylamino-4-chlorobenzene, 1-amino-3-(N,N-di-sulfo-benzylamino)-benzene, 1-(3'-aminophenyl)3-methyl-5-pyrazolone as well as 1-(aminophenyl)-3-carboxy-5-pyrazolones which can be substituted in the phenyl nucleus by chlorine, methyl, methoxy, nitro or sulfo, such as 1-(2'-sulfo-4'-aminophenyl)-3-carboxypyrazol-5-one.

If one of the two components contains both reactive groups at the same time or these can be introduced into the component in question, as in the case of the coupling components of the formulae

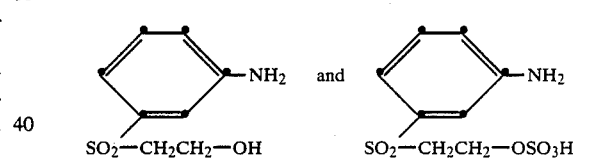

the other component, in this case the diazo component, can also be non-reactive. Examples are aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 2-aminodiphenyl ether, 1-aminobenzene-2-, -3- or -4-sulfonamide, 1-aminobenzene-2-, -3- or -4-carboxylic acid, dehydrothio-p-toluidine-sulfonic acid, 1-amino-3-trifluoromethylbenzene-6-sulfonic acid, 1-amino-benzene-2-, -3- or -4-sulfonic acid, 1-aminobenzene-2,4-and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino- 2,4-dimethoxy-benzene-6-sulfonic acid, 1-amino-2,5-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 2-aminonaphthalene-3,6- or -5,7-disulfonic acid, 1-amino-naphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-amino-benzene-5-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-o-acetylaminobenzene-4-sulfonic acid, 1- hydroxy-2-amino-4-chlorobenzene-5-sulfonic acid, 1-hydroxy-2-amino-4-methylsulfonylbenzene, 1-amino-2-hydroxy-6-nitro- naphthalene-6-sulfonic acid, 2-amino-1-hydroxynaphthalene-4,8-disulfonic acid, 4-aminoazobenzene-3,4'-disulfonic acid, 3-methoxy-4-amino-6-methylazobenzene-2',4'-disulfonic acid and 3-methoxy-4-amino-6-methylazobenzene-2',5'-disulfonic acid.

The diazotisation of the intermediates containing a diazotisable amino group is generally effected at low temperatures by the action of nitrous acid in aqueous mineral acid solutions, coupling taking place at weakly acid, neutral or weakly alkaline pH.

The condensation of 2,4,6-trifluoro-5-chloropyrimidine with the diazo components or the coupling components or with acylatable monoazo intermediates or with the aminocontaining dyes of the formula (6) or their precursors preferably takes place at low temperatures and weakly acid, neutral or weakly alkaline pH in aqueous solutions or suspensions. The hydrogen fluoride set free during the condensation is advantageously continuously neutralised by adding aqueous alkali metal hydroxides, carbonates or bicarbonates.

The reactive dyes of the formula (1) are fibre-reactive. Fibre-reactive compounds are to be understood as meaning those capable of reacting with the hydroxyl groups of cellulose or with amino groups of natural or synthetic polyamides to form covalent chemical bonds.

The reactive dyes of the formula (1) are suitable for dyeing and printing a very wide variety of different materials, such as silk, leather, wool, nylon fibres and polyurethanes, and in particular cellulose-containing fibre materials of any kind. Examples of such fibre materials are the natural cellulose fibre, such as cotton, linen and hemp, as well as pulp and regenerated cellulose. The reactive dyes of the formula (1) are also suitable for dyeing or printing hydroxyl-containing fibres contained in blend fabrics, for example blends of cotton with polyester fibres or nylon fibres.

The dyes according to the invention can be applied to the fibre material and fixed on the fibre in various ways, in particular in the form of aqueous dye solutions and print pastes. They are suitable not only for the exhaust method of dyeing but also for dyeing by the pad-dyeing method whereby the cloth is impregnated with aqueous dye solutions which can, if desired, also contain salt, and the dyes are fixed, if desired under heat, after a treatment with alkali or in the presence of alkali. They are particularly suitable for the so-called cold pad-batch method whereby the dye is applied on a pad-mangle together with the alkali. After the fixing the dyeings or prints are thoroughly rinsed with cold and hot water which can, if desired, also contain an agent acting like a dispersant and promoting the diffusion of the unfixed portions.

The reactive dyes of the formula (1) are distinguished by high reactivity and good fixing properties. They can therefore be used in exhaust dyeing at low dye temperatures and require only short steaming times in the pad-steam process. The degrees of fixation are high, and the unfixed portions are readily washed off, the difference between the degree of exhaustion and the degree of fixation being remarkably small, i.e. the hydrolysis loss being very low. The reactive dyes of the formula (1) are also suitable for printing, especially on cotton, but also for printing nitrogen-containing fibres, for example wool, silk or wool-containing blend fabrics.

The dyeings and prints prepared with the dyes according to the invention are distinguished by bright shades. In particular the dyeings and prints on cellulose fibre materials are of high tinctorial strength and have a high fibre-dye bond stability not only in the acid but also in the alkaline range, and also good lightfastness and very good wetfastness properties, such as wash, water, sea water, cross-dyeing and perspiration fastness properties, as well as a good fastness to pleating, hot-press fastness and rub fastness.

The following examples serve to illustrate the invention. The temperatures are given in degrees centigrade. The parts and percentages are by weight, unless otherwise stated. Parts by weight relate to parts by volume as the kilogramme relates to the litre.

The preparation of the monoazo intermediates has not been described in all cases in the following illustrative embodiments, but it is anyhow readily apparent from the general description.

EXAMPLE 1

64 parts of 1-amino-8-naphthol-3,6-disulfonic acid are dissolved at pH 9.0–9.5 in 800 parts of water in the presence of 30% strength sodium hydroxide solution. The solution is cooled down to 10° C., and 34 parts of 2,4,6-trifluoro-5-chloropyrimidine are added dropwise while pH 9.25–9.5 is maintained by the dropwise addition of 5N sodium hydroxide solution. The mixture is stirred at pH 8.5–9.0 at 15° C. for 15 minutes and is then brought to pH 6.5 by adding 4N hydrochloric acid solution.

The solution is used as a coupling component in dye synthesis.

To prepare the diazonium compound, 56 parts of aniline 4-β-sulfatoethyl sulfone are suspended in 500 parts of ice-water, and the suspension is acidified with 45 parts of concentrated aqueous hydrochloric acid and is diazotised with 40 parts by volume of 5N sodium nitrite solution. The mixture is stirred at about 5° C. for 2 hours and the excess nitrous acid is then destroyed by means of sulfamic acid. The diazonium salt solution thus prepared is slowly added at pH 5.5–6.0 to the solution of the coupling component. The mixture is stirred for 2 hours until the coupling has ended. pH 5.5–6.0 is maintained by adding sodium bicarbonate. The dye is then precipitated with sodium chloride, is isolated using a suction funnel and is dried at 40° C. in vacuo. Grinding produces a red electrolyte-containing dye powder which contains the sodium salt of the compound of the formula

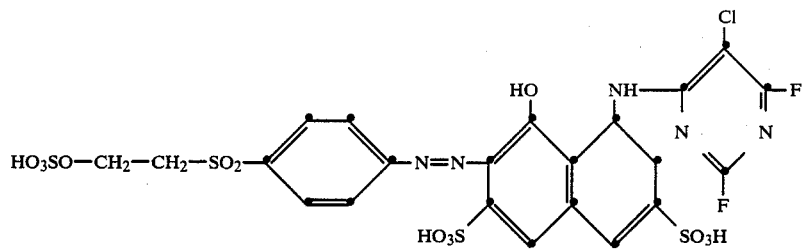

This compound has very good dye properties and dyes cellulose materials by the dyeing and printing methods customary for reactive dyes in bluish red shades having very good wetfastness properties.

EXAMPLE 2

64 parts of 1-amino-8-naphthol-3,6-disulfonic acid are dissolved at pH 9.0–9.5 in 800 parts of water in the presence of 30% strength sodium hydroxide solution. The solution is cooled down to 10° C., and 34 parts of 2,4,6- trifluoro-5-chloropyrimidine are added dropwise while pH 9.25–9.5 is maintained by the dropwise addition of 5N sodium hydroxide solution. The mixture is stirred at pH 8.5–9.0 at 15° C. for 15 minutes and is then brought to pH 6.5 by adding 4N hydrochloric acid solution.

The solution is used as a coupling component in dye synthesis.

To prepare the diazonium compound, 56 parts of aniline 3-β-sulfatoethyl sulfone are suspended in 500 parts of ice-water, and the suspension is acidified with 45 parts of concentrated aqueous hydrochloric acid and is diazotised with 40 parts by volume of 5N sodium nitrite solution. The mixture is stirred at about 5° C. for 2 hours and the excess nitrous acid is then destroyed by means of sulfamic acid. The diazonium salt solution thus prepared is slowly added at pH 5.5–6.0 to the solution of the coupling component. The mixture is stirred for 2 hours until the coupling has ended. pH 5.5–6.0 is maintained by adding sodium bicarbonate. The dye is then precipitated with sodium chloride, is isolated using a suction funnel and is dried at 40° C. in vacuo. Grinding produces a red electrolyte-containing dye powder which contains the sodium salt of the compound of the formula

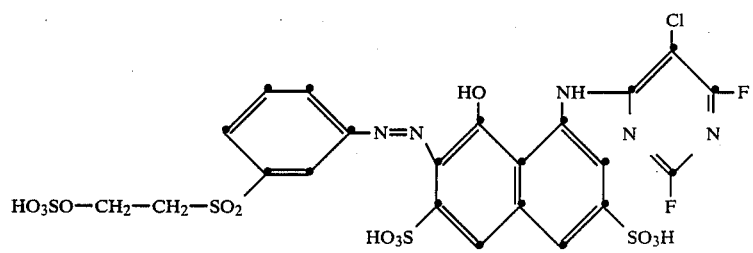

This compound has very good dye properties and dyes cellulose materials by the dyeing and printing methods customary for reactive dyes in bluish red shades having very good wetfastness properties.

EXAMPLE 3

64 parts of 1-amino-8-naphthol-4,6-disulfonic acid are dissolved at pH 9.0–9.5 in 800 parts of water in the presence of 30% strength sodium hydroxide solution. The solution is cooled down to 10° C., and 34 parts of 2,4,6-trifluoro-5-chloropyrimidine are added dropwise while pH 9.25–9.5 is maintained by the dropwise addition of 5N sodium hydroxide solution. The mixture is stirred at pH 8.5–9.0 at 15° C. for 15 minutes and is then brought to pH 6.5 by adding 4N hydrochloric acid solution.

The solution is used as a coupling component in dye synthesis.

To prepare the diazonium compound, 56 parts of aniline 4-β-sulfatoethyl sulfone are suspended in 500 parts of ice-water, and the suspension is acidified with 45 parts of concentrated aqueous hydrochloric acid and is diazotised with 40 parts by volume of 5N sodium nitrite solution. The mixture is stirred at about 5° C. for 2 hours and the excess nitrous acid is then destroyed by means of sulfamic acid. The diazonium salt solution thus prepared is slowly added at pH 5.5–6.0 to the solution of the coupling component. The mixture is stirred for 2 hours until the coupling has ended. pH 5.5–6.0 is maintained by adding sodium bicarbonate. The dye is then precipitated with sodium chloride, is isolated using a suction funnel and is dried at 40° C. in vacuo. Grinding produces a red electrolyte-containing dye powder which contains the sodium salt of the compound of the formula

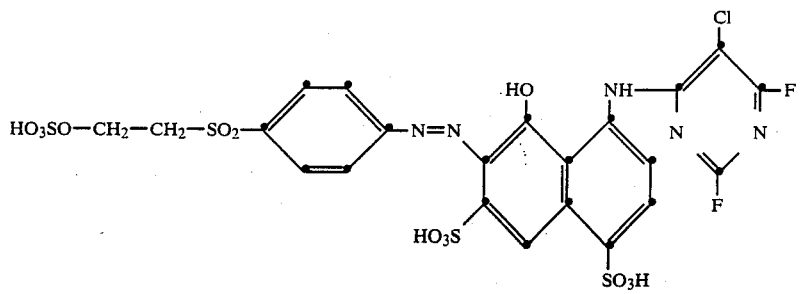

This compound has very good dye properties and dyes cellulose materials by the dyeing and printing methods customary for reactive dyes in neutral red shades having very good wetfastness properties.

EXAMPLE 4

48 parts of 2-amino-5-naphthol-7-sulfonic acid are dissolved at pH 6.0-6.5 in 800 parts of water in the presence of 30% strength sodium hydroxide solution. The solution is cooled down to 10° C., and 34 parts of 2,4,6-tri-fluoro-5-chloropyrimidine are added dropwise while pH 6.0-6.5 is maintained by the dropwise addition of 5N sodium hydroxide solution. The mixture is stirred at pH 6.0-6.5 at 15° C. for 20 minutes.

The solution is used as a coupling component in dye synthesis.

To prepare the diazonium compound, 56 parts of aniline 4-β-sulfatoethyl sulfone are suspended in 500 parts of ice-water, and the suspension is acidified with 45 parts of concentrated aqueous hydrochloric acid and is diazotised with 40 parts by volume of 5N sodium nitrite solution. The mixture is stirred at about 5° C. for 2 hours and the excess nitrous acid is then destroyed by means of sulfamic acid. The diazonium salt solution thus prepared is slowly added at pH 5.5-6.0 to the solution of the coupling component. The mixture is stirred for 2 hours until the coupling has ended. pH 5.5-6.0 is maintained by adding sodium bicarbonate. The dye is then precipitated with sodium chloride, is isolated using a suction funnel and is dried at 40° C. in vacuo. Grinding produces a red electrolyte-containing dye powder which contains the sodium salt of the compound of the formula 6.5-7.0 becoming established. The solution is stirred at this pH for 2 hours, when 750 parts of ice and 255 parts of 31% strength aqueous hydrochloric acid are added; 173 parts of 40% strength aqueous sodium nitrite solution are then added, the mixture is stirred at 0° to 5° C. for a further 2 hours, and excess nitrous acid is then destroyed by means of sulfamic acid. To the diazonium salt suspension thus prepared is then added at pH 6.0-6.5, simultaneously with about 70 parts of sodium carbonate, a solution of the condensation product of 1 mol each of cyanuric chloride and 1-amino-8-naphthol-3,6-disulfonic acid and 3-aminoacetanilide-4-sulfonic acid and 2,4,6-trifluoro-5-chloropyrimidine. This solution of the condensation product is prepared as follows: 319 parts of 1-amino-8-naphthol-3,6-disulfonic acid are added with stirring to a mixture of 500 parts of water and 121 parts of 33% strength sodium hydroxide solution; the solution should afterwards be at pH 6.5-7.0. This solution is added in the course of an hour at pH 3.0-3.8 to a suspension of 194 parts of cyanuric chloride, 800 parts of water and 800 parts of ice. The mixture is then stirred at 0° to 5° C. and the indicated pH, maintained by sprinkling in 92 parts of sodium bicarbonate, for a further hour. To this clear solution thus obtained is then added 221 parts of 3-aminoacetanilide-4-sulfonic acid, followed by 105 parts of sodium carbonate in the course of an hour during which the pH rises to 4.5-5.0. The solution is stirred at this pH for a further 2 hours during which the temperature is maintained at 35° to 40° C. 400 parts of concentrated sodium hydroxide are added, and the mixture is stirred at 70° to 75° C. for 2 hours. It is then neutralised with concentrated hydrochloric acid. To this neutral solution is then added drop-

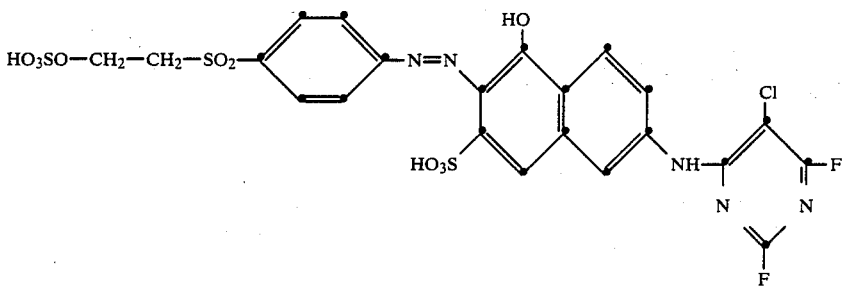

This compound has very good dye properties and dyes cellulose materials by the dyeing and printing methods customary for reactive dyes in orange shades having very good wetfastness properties.

EXAMPLE 5

281 parts of 4-β-sulfatoethylsulfonylaniline are added to 1000 parts of water and are dissolved therein by carefully adding 65 parts of sodium carbonate, pH wise in the course of an hour at 10° to 15° C. 169 parts of 2,4,6-trifluoro-5-chloropyrimidine.

After the diazonium suspension and the solution of the coupling component have been combined, the coupling mixture is stirred at room temperature for 2 hours during which it is held at pH 6.0-6.5 by sprinkling in 70 parts of sodium carbonate a little at a time. After the coupling has ended the mixture is heated to 50° C., 40 parts of kieselguhr are added, the solution is clarified by filtering, and the filtrate is spray-dried.

The result is a red electrolyte-containing powder which contains the alkali metal salt, in particular the sodium salt, of the compound of the formula

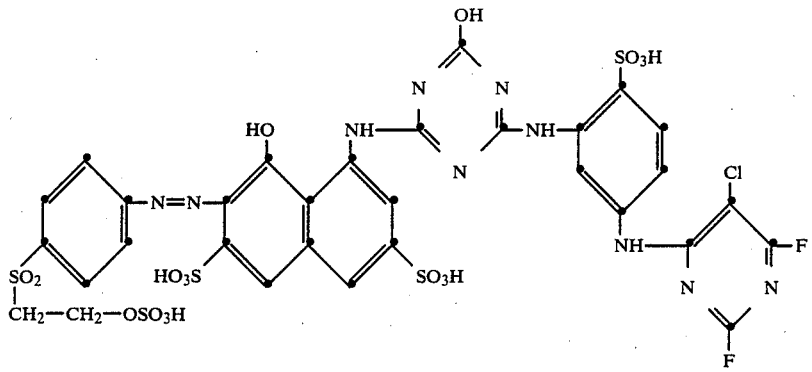

and may contain the buffer substance mentioned. This compound has very good dye properties; it dyes the materials mentioned in the description, in particular wool from an acid bath or cellulose fibre materials in the presence of acid-binding agents, by the industrially customary application and fixing methods for fibre-reactive dyes in clear red shades having very good build-up and a high degree of fixation. The dyeings have very good wetfastness properties, for example an excellent wash fastness, and a high resistance to steaming and very good rub fastness, as well as very fast properties as regards the bleeding onto or staining of adjacent fabric.

EXAMPLE 6

64 parts of 1-amino-8-naphthol-3,6-disulfonic acid are dissolved at pH 4.5-5.0 in 800 parts of water in the presence of 15 parts of sodium carbonate. The solution is then cooled down to 0° C. and 28 parts of cyanuric fluoride are added dropwise, the pH decreasing and being held at 3-4 by sprinkling in sodium bicarbonate powder. The mixture is stirred at pH 3-4 and 0° C. for 15 minutes, and a solution of the sodium salt of 68 parts of 2,4-difluoro-5-chloro-6-(3'-amino-4'-sulfophenylamino)-pyrimidine is then added. The solution is stirred at 20° to 25° C. and pH 5 for 5 hours until no free amine is any longer detectable by diazotisation test. The solution is used as a coupling component in dye synthesis.

To prepare the diazonium compound, 56 parts of aniline 4-β-sulfatoethyl sulfone are suspended in 500 parts of ice-water, and the suspension is acidified with 45 parts of concentrated aqueous hydrochloric acid and is diazotised with 40 parts by volume of 5N sodium nitrite solution. The mixture is stirred at about 5° C. for 2 hours and the excess nitrous acid is then destroyed by means of sulfamic acid. The diazonium salt solution thus prepared is slowly added at pH 5.5-6.0 to the solution of the coupling component. The mixture is stirred for 2 hours until the coupling has ended. pH 5.5-6.0 is maintained by adding sodium bicarbonate. The dye is then precipitated with sodium chloride, is isolated using a suction funnel and is dried at 40° C. in vacuo. Grinding produces a red electrolyte-containing dye powder which contains the sodium salt of the compound of the formula

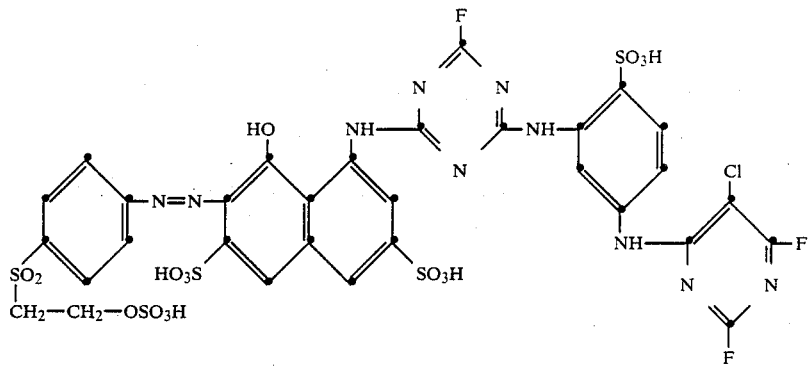

This compound has very good dye properties and dyes cotton and wool by the dyeing and printing methods customary for reactive dyes in red shades having very good wetfastness properties.

The dyes given in the following table, which dye cotton in the indicated hue, can also be prepared analogously to the methods described.

| No. | Example | Hue on cotton |
|---|---|---|
| 8 | (structure with chloro-fluoro-pyrimidine-NH-phenyl(SO₃H)-N=N-C(COOH)=C(OH)-N=N-phenyl-SO₂CH₂CH₂OSO₃H) | greenish yellow |
| 9 | HO₃SSH₄C₂O₂S–phenyl–N=N–naphthalene(OH, 2×SO₃H)–NH–C(Cl)=C(F)–N=N–C(F)= | bluish red |
| 10 | HO₃SSH₄C₂O₂S–phenyl–N=N–naphthalene(OH, 2×SO₃H)–NH–C(Cl)=C(F)–N=N–C(F)= | bluish red |
| 11 | HO₃SOH₄C₂O₂S–phenyl(SO₃H)–N=N–naphthalene(OH, 2×SO₃H)–NH–C(Cl)=C(F)–N=N–C(F)= | bluish red |
| 12 | HO₃SSH₄C₂O₂S–phenyl–N=N–naphthalene(OH, 2×SO₃H)–NH–C(Cl)=C(F)–N=N–C(F)= | red |

| No. | Example | Hue on cotton |
|---|---|---|
| 13 | H₂C=HCO₂S—C₆H₄—N=N—[naphthalene(HO, HO₃S, SO₃H)]—NH—C(Cl)=C(F)—N=N—CH=C(F) (difluorochloropyrimidinyl) | bluish red |
| 14 | Cl—H₂C—CH₂O₂S—C₆H₄—N=N—[naphthalene(HO, HO₃S, SO₃H)]—NH—C(Cl)=C(F)—N=N—CH=C(F) | bluish red |
| 15 | CH₃—C(=O)—O—CH₂CH₂—O₂S—C₆H₄—N=N—[naphthalene(HO, HO₃S, SO₃H)]—NH—C(Cl)=C(F)—N=N—CH=C(F) | bluish red |
| 16 | HO₃SOH₄C₂O₂S—C₆H₄—N=N—[naphthalene(HO, HO₃S)]—NH—C(Cl)=C(F)—N=N—CH=C(F) | golden yellow |
| 17 | HO₃SOH₄C₂O₂S—C₆H₃(SO₃H)—N=N—[naphthalene(HO, HO₃S)]—NH—C(Cl)=C(F)—N=N—CH=C(F) | orange |

TABLE-continued

| No. | Example | Hue on cotton |
|---|---|---|
| 18 | HO₃SOC₄H₄O₂S–[phenyl]–N=N–[naphthalene with OH, HO₃S]–NH–[C(Cl)=C(F)–N=N–C(=CHF... pyrazole with F]] | orange |
| 19 | HO₃SOH₄C₂O₂S–[phenyl]–N=N–[naphthalene with OH, HO₃S]–NH–[C(Cl)=C(F)–pyrazole with F] | scarlet |
| 20 | HO₃SOH₄C₂O₂S–[phenyl]–N=N–[naphthalene with OH, HO₃S]–NH–C(OH)=N–C(=N)–NH–[phenyl with SO₃H]–NH–[C(Cl)=C(F)–pyrazole with F] | orange |
| 21 | HO₃SOH₄C₂O₂S–[phenyl]–N=N–[naphthalene with OH, HO₃S]–NH–C(Cl)=N–C(=N)–NH–[phenyl with SO₃H]–NH–[C(Cl)=C(F)–pyrazole with F] | orange |
| 22 | HO₃SOH₄C₂O₂S–[phenyl]–N=N–[naphthalene with OH, HO₃S]–NH–C(F)=N–C(=N)–NH–[phenyl with HO₃S, SO₃H]–NH–[C(Cl)=C(F)–pyrazole with F] | orange |
| 23 | | scarlet |

TABLE-continued

| No. | Example | Hue on cotton |
|---|---|---|
| | (structure) | |
| 24 | (structure) | yellowish red |
| 25 | (structure) | yellowish red |
| 26 | (structure) | yellowish red |
| 27 | (structure) | yellowish red |

TABLE-continued

| No. | Example | Hue on cotton |
|---|---|---|
| 28 | (structure) | red |
| 29 | (structure) | orange |
| 30 | (structure) | scarlet |
| 31 | (structure) | orange |
| 32 | (structure) | scarlet |

TABLE-continued

| No. | Example | Hue on cotton |
|---|---|---|
| 33 | ClCH2CH2SO2CH2CH2NH-triazine(Cl)-NH-phenyl(SO3H)(SO3H)-N=N-naphthol(OH)(SO3H)-NH-pyrimidine(Cl)(F)(F) | red |
| 34 | ClCH2CH2SO2CH2CH2NH-triazine(Cl)-NH-phenyl(SO3H)(SO3H)-N=N-naphthol(OH)(SO3H)-NH-pyrimidine(Cl)(F)(F) | scarlet |
| 35 | ClCH2CH2SO2CH2CH2NH-triazine(Cl)-NH-phenyl(SO3H)-N=N-naphthol(OH)(SO3H)(SO3H)-NH-pyrimidine(Cl)(F)(F) | bluish red |
| 36 | ClCH2CH2SO2CH2CH2NH-triazine(Cl)-NH-phenyl(SO3H)(SO3H)-N=N-naphthol(OH)(SO3H)(SO3H)-NH-pyrimidine(Cl)(F)(F) | red |
| 37 | ClCH2CH2SO2CH2CH2OCH2CH2NH-triazine(Cl)-NH-phenyl(SO3H)-N=N-naphthol(OH)(SO3H)-NH-pyrimidine(Cl)(F)(F) | orange |
| 38 | | scarlet |

TABLE-continued

| No. | Example | Hue on cotton |
|---|---|---|
| | ClCH₂CH₂SO₂CH₂CH₂OCH₂CH₂NH—[triazine(Cl)]—NH—[phenyl(SO₃H)]—N=N—[naphthyl(OH)(HO₃S)]—NH—[chlorofluoropyrimidine] | |
| 39 | ClCH₂CH₂SO₂CH₂CH₂OCH₂CH₂NH—[triazine(Cl)]—NH—[phenyl(HO₃S)(SO₃H)]—N=N—[naphthyl(OH)(HO₃S)]—NH—[chlorofluoropyrimidine] | orange |
| 40 | ClCH₂CH₂SO₂CH₂CH₂OCH₂CH₂NH—[triazine(Cl)]—NH—[phenyl(SO₃H)(SO₃H)]—N=N—[naphthyl(OH)(HO₃S)]—NH—[chlorofluoropyrimidine] | scarlet |
| 41 | (ClCH₂CH₂SO₂CH₂CH₂)₂N—[triazine(Cl)]—NH—[phenyl(SO₃H)(SO₃H)]—N=N—[naphthyl(OH)(HO₃S)]—NH—[chlorofluoropyrimidine] | red |
| 42 | (ClCH₂CH₂SO₂CH₂CH₂)₂N—[triazine(Cl)]—NH—[phenyl(HO₃S)(SO₃H)]—N=N—[naphthyl(OH)(HO₃S)]—NH—[chlorofluoropyrimidine] | scarlet |

| No. | Example | Hue on cotton |
|---|---|---|
| 43 | ClCH₂CH₂SO₂CH₂CH₂NH—[triazine(F)]—NH—[phenyl(SO₃H)]—N=N—[naphthalene(OH)(HO₃S)(SO₃H)]—NH—[difluoropyrimidine(Cl)] | bluish red |
| 44 | ClCH₂CH₂SO₂CH₂CH₂NH—[triazine(F)]—NH—[phenyl(HO₃S)(SO₃H)]—N=N—[naphthalene(OH)(HO₃S)(SO₃H)]—NH—[difluoropyrimidine(Cl)] | red |

Dyeing method I 2 parts of the dye obtained in Example 1 are dissolved in 400 parts of water; to this solution are added 1,500 parts of a solution which contains per litre 53 g of sodium chloride. 100 parts of a cotton fabric are introduced at 40° C. into this dyebath. After 45 minutes 100 parts of a solution which contains per litre 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per litre 53 g of sodium chloride. 100 parts of a cotton fabric are introduced at 35° C. into this dyebath. After 20 minutes 100 parts of a solution which contains per litre 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per litre 100 g of sodium sulfate. 100 parts of a cotton fabric are introduced at 25° C. into this dyebath. After 10 minutes 200 parts of a solution which contains per litre 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water; to this solution are added 50 parts of a solution which contains per litre 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

Dyeing method V 6 parts of the reactive dye obtained in Example 1 are dissolved in 50 parts of water; to this solution are added 50 parts of a solution which contains per litre 16 g of sodium hydroxide and 0.04 litre of sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

Dyeing method VI 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per litre 4 g of sodium hydroxide and 300 g of sodium chloride, and is squeezed to a 75% weight increase and the dyeing is steamed at 100° to 102° C. for 30 seconds, is rinsed, is soaped off at the boil with 0.3% strength solution of a nonionic detergent for a quarter of an hour, is rinsed and is dried.

Printing method I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric, which is then dried, and the resulting printed fabric is steamed at 102° C. in saturated steam for 2 minutes. The printed fabric is then rinsed, if desired soaped off at the boil and rinsed once more, and is then dried.

Printing method II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, if desired soaped off at the boil and rinsed once more, and is then dried.

I claim:

1. A reactive dye of the formula

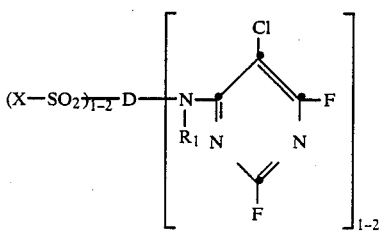

in which D is the radical of a monoazo, metal complex azo, phthalocyanine, formazan, or dioxazine, naphthoquinone, pyrenequinone or perylenetetracarimide dye; $R_1$ is hydrogen or $C_{1-4}$-alkyl unsubstituted or substituted by halogen, hydroxyl, cyano, $C_{1-4}$-alkoxy, carboxyl or sulfo, or is methoxycarbonylmethyl, ethoxycarbonylmethyl, aminosulfonylmethyl or $\beta$-sulfatoethyl; and X is vinyl, $\beta$-sulfatoethyl, $\beta$-thiosulfatoethyl, $\beta$-chloroethyl or $\beta$-acetoxyethyl; and D is unsubstituted or substituted by alkyl having 1 to 4 carbon atoms alkoxy having 1 to 4 carbon atoms, carbacylamino having 1 to 8 carbon atoms, amino, alkylamino having 1 to 4 carbon atoms, phenylamino, N,N-di-hydroxyethylamino N,N-di-$\beta$-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-($\beta$-hydroxyethyl)-sulfamoyl, N,N-di-($\beta$-hydroxyethyl)-sulfamoyl, N-phenylsulfamoyl, ureido, hydroxyl, carboxyl, sulfomethyl or sulfo.

2. A reactive dye according to claim 1 in which X is vinyl or $\beta$-sulfatoethyl.

3. A reactive dye according to claim 1, in which D is a radical of the monoazo dye or metal complex azo dye.

4. A reactive dye according to claim 3 in which X is vinyl or $\beta$-sulfatoethyl.

5. A reactive dye according to claim 3 of the formula

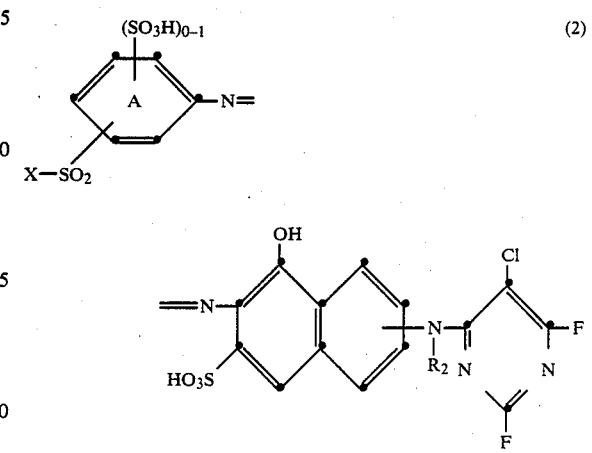

in which $R_2$ is hydrogen, methyl or ethyl, and the benzene ring A is not further substituted or is further substituted by alkyl having 1 to 4 carbon atoms, alkoxy having 1 to 4 carbon atoms, carbacylamino having 1 to 8 carbon atoms, amino, alkylamino having 1 to 4 carbon atoms, phenylamino, N,N-di-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-($\beta$-hydroxyethyl)-sulfamoyl, N,N-di($\beta$-hydroxyethyl)-sulfamoyl, N-phenylsulfamoyl, ureido, hydroxyl, carboxyl, sulfomethyl or sulfo.

6. A reactive dye according to claim 5 in which X is vinyl or $\beta$-sulfatoethyl.

7. A reactive dye according to claim 3 of the formula

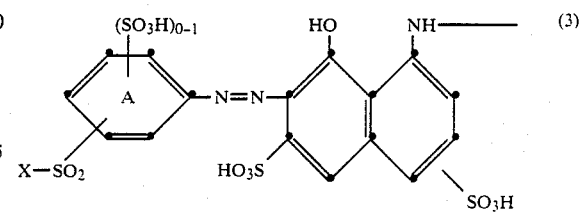

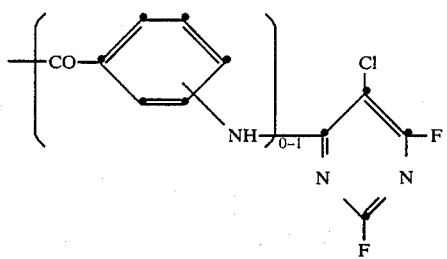

in which the benzene ring A is not further substituted or is further substituted by alkyl having 1 to 4 carbon atoms, alkoxy having 1 to 4 carbon atoms, carbacylamino having 1 to 8 carbon atoms, amino, alkylamino having 1 to 4 carbon atoms, phenylamino, N,N-di-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di(β-hydroxyethyl)-sulfamoyl, N-phenylsulfamoyl, ureido, hydroxyl, carboxyl, sulfomethyl or sulfo.

8. A reactive dye according to claim 7 in which X is vinyl or β-sulfatoethyl.

9. A reactive dye according to claim 7 in which the benzene ring A is not further substituted.

10. A reactive dye according to claim 9 in which X is vinyl or β-sulfatoethyl.

11. A reactive dye according to claim 3 of the formula

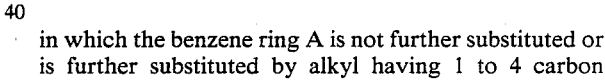

in which R₃ is hydrogen, methyl or ethyl, and the benzene ring A is not further substituted or is further substituted by alkyl having 1 to 4 carbon atoms, alkoxy having 1 to 4 carbon atoms, carbacylamino having 1 to 8 carbon atoms, amino, alkylamino having 1 to 4 carbon atoms, phenylamino, N,N-di-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di(β-hydroxyethyl)-sulfamoyl, N-phenylsulfamoyl, ureido, hydroxyl, carboxyl, sulfomethyl or sulfo.

12. A reactive dye according to claim 11 in which X is vinyl or β-sulfatoethyl.

13. A reactive dye according to claim 3 of the formula

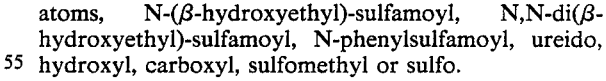

in which the benzene ring A is not further substituted or is further substituted by alkyl having 1 to 4 carbon atoms, alkoxy having 1 to 4 carbon atoms, carbacylamino having 1 to 8 carbon atoms, amino, alkylamino having 1 to 4 carbon atoms, phenylamino, N,N-di-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di(β-hydroxyethyl)-sulfamoyl, N-phenylsulfamoyl, ureido, hydroxyl, carboxyl, sulfomethyl or sulfo.

14. A reactive dye according to claim 13 in which X is vinyl or β-sulfatoethyl.

* * * * *